United States Patent
Yen et al.

[19]

[11] Patent Number: 6,021,992
[45] Date of Patent: Feb. 8, 2000

[54] PASSIVE VIBRATION ISOLATING SYSTEM

[75] Inventors: Kelson Z. Y. Yen, Taichung; Yuan-Jyi Lee, Taichung Hsien, both of Taiwan

[73] Assignee: Taichung Machinery Works Co., Ltd., Taichung, Taiwan

[21] Appl. No.: 08/880,583

[22] Filed: Jun. 23, 1997

[51] Int. Cl.[7] .............................. F16M 13/00; E04H 9/02
[52] U.S. Cl. ........................................ 248/560; 52/167.9
[58] Field of Search .................................. 248/560, 638, 248/632, 562; 52/167.8, 167.7, 167.4, 167.9

[56] References Cited

U.S. PATENT DOCUMENTS

| | | | |
|---|---|---|---|
| 4,320,549 | 3/1982 | Greb | 52/167.9 X |
| 4,496,130 | 1/1985 | Toyama | 52/167.8 X |
| 4,644,714 | 2/1987 | Zayas | 52/167.9 X |
| 5,442,883 | 8/1995 | Nishimura et al. | 52/167.8 X |
| 5,597,239 | 1/1997 | Scaramuzza et al. | 52/167.4 X |
| 5,689,919 | 11/1997 | Yano | 248/562 X |
| 5,867,951 | 2/1999 | Yaguchi et al. | 52/167.4 |

*Primary Examiner*—Ramon O. Ramirez
*Assistant Examiner*—Anita M. King
*Attorney, Agent, or Firm*—Heller Ehrman White & McAuLiffe

[57] ABSTRACT

A passive vibration isolating system includes a sliding piece having a lower portion mounted on a base member and a first contact surface defined between the lower portion of the sliding piece and a top portion of the base member, and a supporting member mounted on an upper portion of the sliding piece and a second contact surface defined between a bottom portion of the supporting member and the upper portion of the sliding piece. At least one of the first and second contact surfaces is a curved surface with a concave-convex engagement.

4 Claims, 8 Drawing Sheets

PASSIVE VIBRATION ISOLATING SYSTEM

FIELD OF THE INVENTION

The present invention relates to a passive vibration isolating system.

BACKGROUND OF THE INVENTION

Two conventional passive vibration isolating systems are shown in FIGS. 7–10, and a complete illustration will follow in the detailed description of the preferred embodiments.

The present invention has arisen to mitigate and/or obviate disadvantages of the conventional passive vibration isolating systems.

SUMMARY OF THE INVENTION

In accordance with one aspect of the present invention, there is provided a passive vibration isolating system which comprises a base member, a sliding piece having a lower portion mounted on the base member and a first contact surface defined between the lower portion of the sliding piece and a top portion of the base member, and a supporting member mounted on an upper portion of the sliding piece and a second contact surface defined between a bottom portion of the supporting member and the upper portion of the sliding piece.

By such an arrangement, at least one of the first and second contact surfaces is a curved surface with a concave-convex engagement.

Further features of the present invention will become apparent from a careful reading of the detailed description with appropriate reference to the accompanying drawings.

DETAILED DESCRIPTION OF THE PREFERRED EMBODIMENTS

For a better understanding of the features and benefits of the present invention, reference is now made to FIGS. 7–10 illustrating two conventional passive vibration isolating systems according to the prior art.

Figure 7:
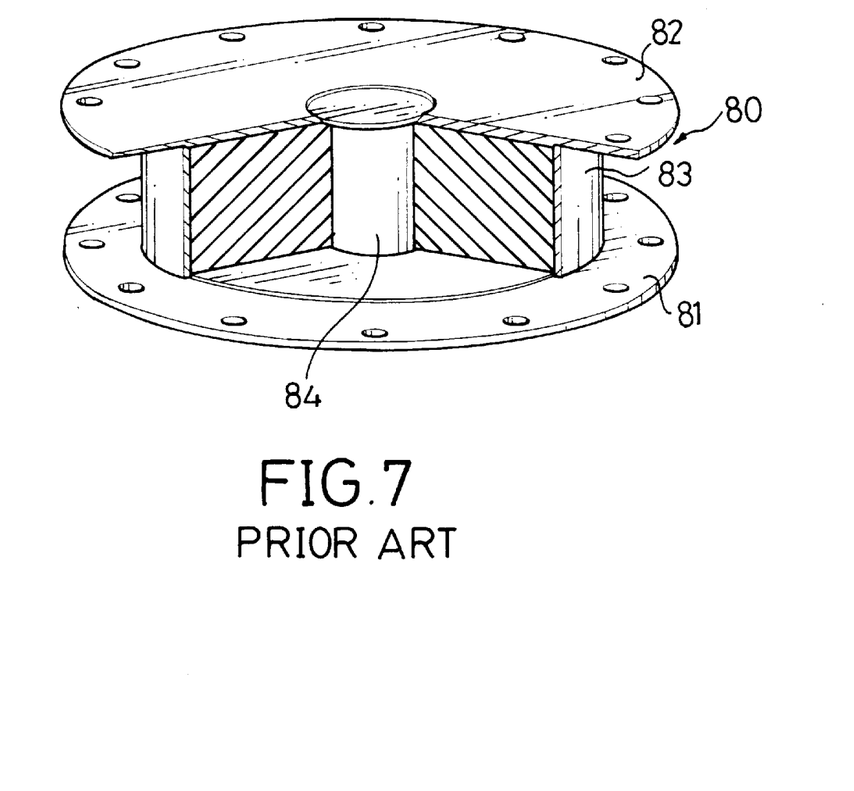
FIG. 7 is a partially cross-sectional perspective view of a first conventional passive vibration isolating system in accord with the prior art.
Figure 8:
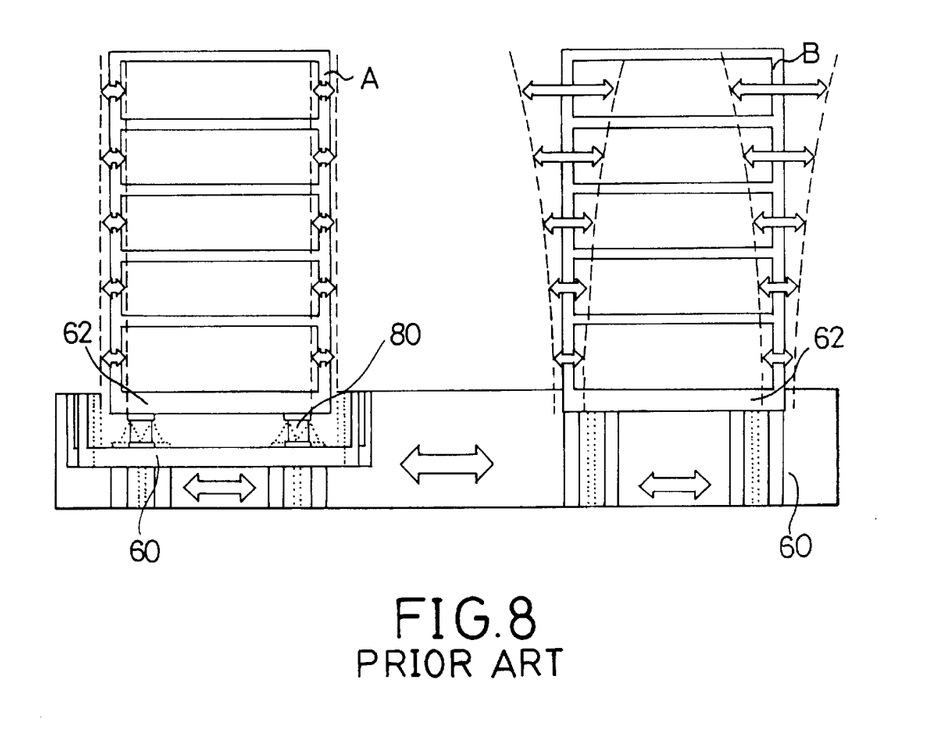
FIG. 8 is a front plan schematic view showing the first conventional passive vibration isolating system being fitted between a building and a ground base.
Figure 9:
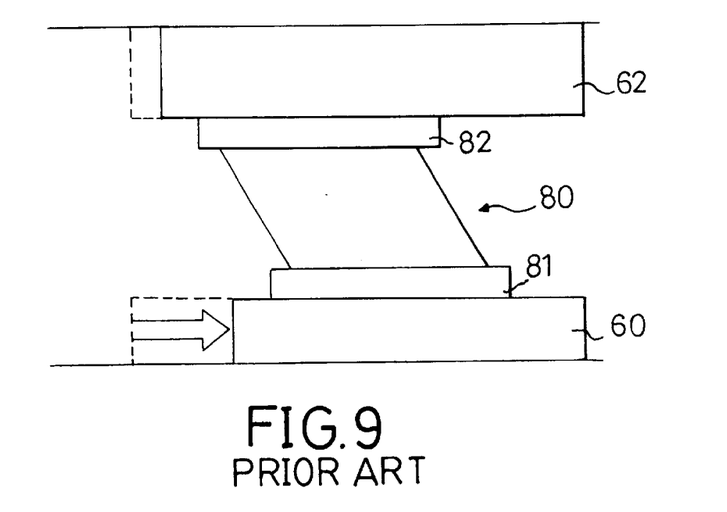
FIG. 9 is a partially enlarged view of FIG. 8.

Referring to FIGS. 7–9, a first conventional passive vibration isolating system comprises a plurality of lead rubber bearings 80 each of which is mounted between a building 62 and a ground base 60.

Each of the lead rubber bearings 80 includes a base plate 81 fixedly mounted on the ground base 60, a supporting plate 82 fixedly mounted on an underside of the building 62, a rubber pad 83 supported between the base plate 81 and the supporting plate 82, and a lead column 84 mounted in a center of the rubber pad 83 and located between the base plate 81 and the supporting plate 82.

In operation, when an earthquake occurs, the base plate 81 is moved with the ground base 60 along a direction indicated by an arrow as shown in FIG. 9 to exert a shearing force on the lead rubber bearing 80, thereby deforming the rubber pad 83 and the lead column 84.

In the meantime, the supporting plate 82 together with the building 62 is only slightly displaced by means of a plastic deformation or yielding effect of the lead column 84, thereby decreasing the displacement of the building 62 due to the sliding motion of the ground base 60, and thereby efficiently isolating the building 62 from the vibration created by the earthquake. Referring to FIG. 8, the displacement A of the building 62 fitted with the lead rubber bearing 80 is much smaller than the displacement B of the building 62 without the lead rubber bearing 80.

By such an arrangement, however, the rubber pad 83 will be come worn after long-term utilization, thereby decreasing the vibration isolating effect. In addition, the building 62 cannot be returned to its original position due to the plastic deformation of the lead column 84, thereby causing a deviation in the position of the building 62.

Figure 10:
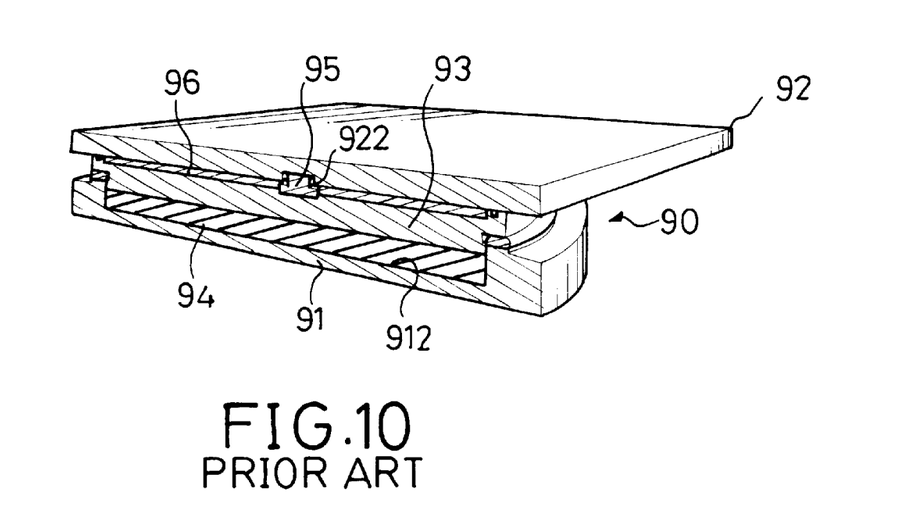
FIG. 10 is a partially cross-sectional perspective view of a second conventional passive vibration isolating system in accordance with the prior art.

Referring to FIG. 10, a second conventional passive vibration isolating system comprises a plurality of pot bearings 90 each of which is mounted between a building (not shown) and a ground base (not shown).

Each of the pot bearings 90 includes a base plate 91 fixedly mounted on the ground base and defining a recess 912 therein, a synthetic rubber 94 received in the recess 912, a bearing disk 93 fixedly mounted on the synthetic rubber 94, an elongate guiding rail 95 fixedly mounted on the bearing disk 93, a supporting plate 92 fixedly mounted on an underside of the building and defining a guiding groove 922 therein for slidably receiving the guiding rail 95, and a wear-resistant resin 96 coated between the bearing disk 93 and the supporting plate 92.

In operation, the supporting plate 92 together with the building can slide on the wear-resistant resin 96 along the guiding rail 95 when an earthquake occurs, thereby greatly decreasing the vibration caused by the earthquake. By such an arrangement, however, it is necessary to provide a damping mechanism for returning the building to its original position. In addition, the supporting plate 92 can only move along one direction, thereby greatly limiting the versatility of the pot bearing 90.

Figure 1:
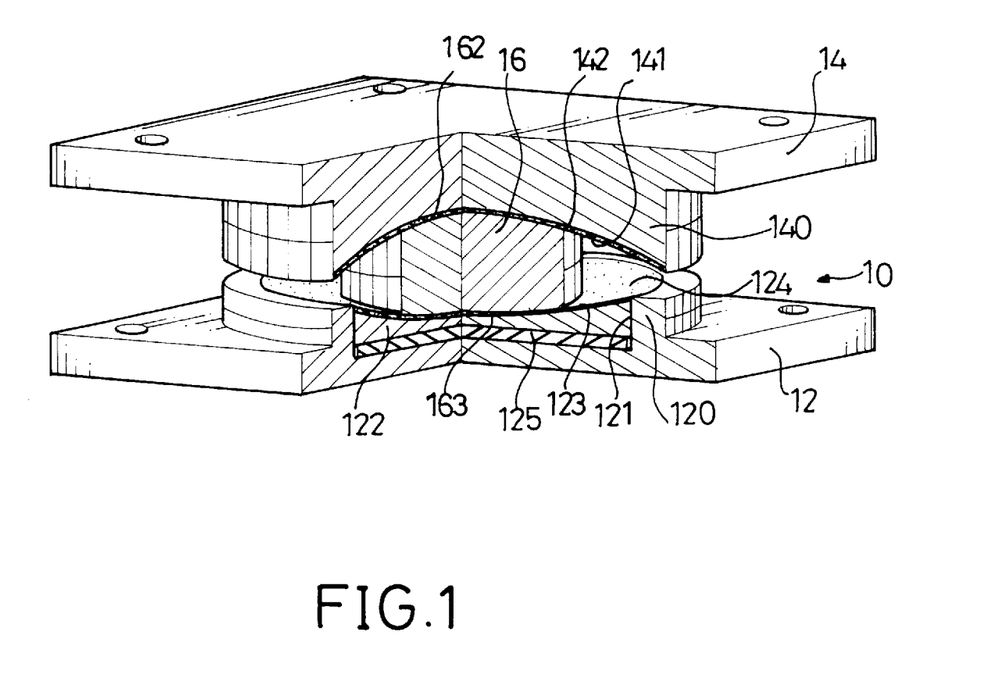
FIG. 1 is a partially cross-sectional perspective view of a passive vibration isolating system according to a first embodiment of the present invention.
Figure 2:
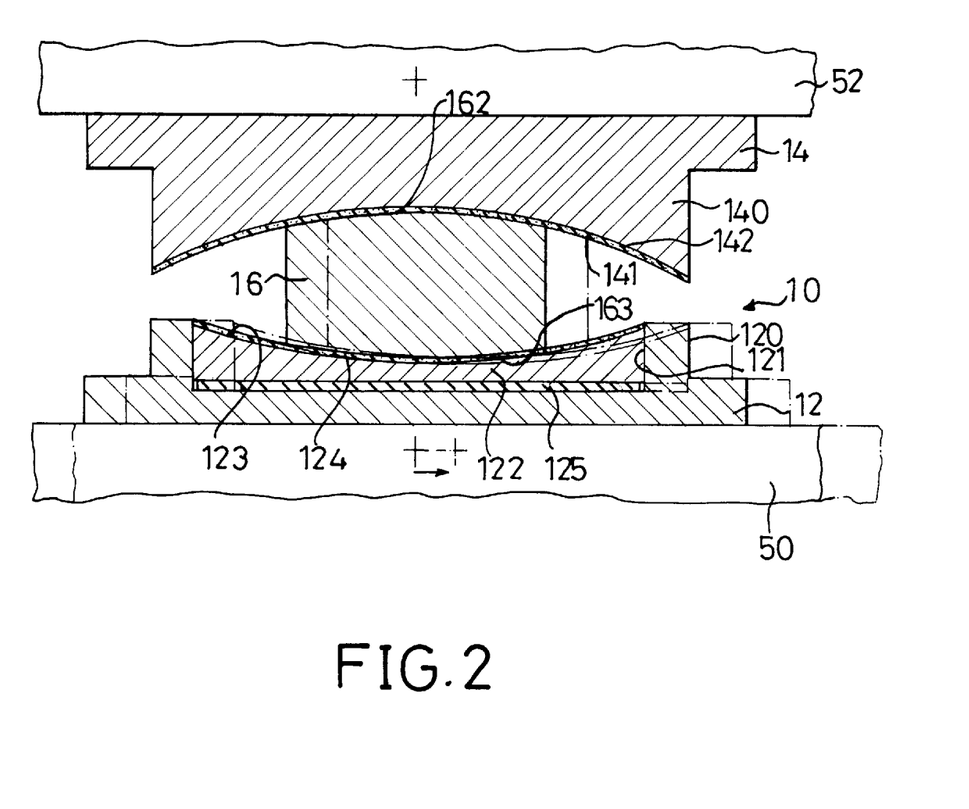
FIG. 2 is a front plan cross-sectional view of FIG. 1.
Figure 3:
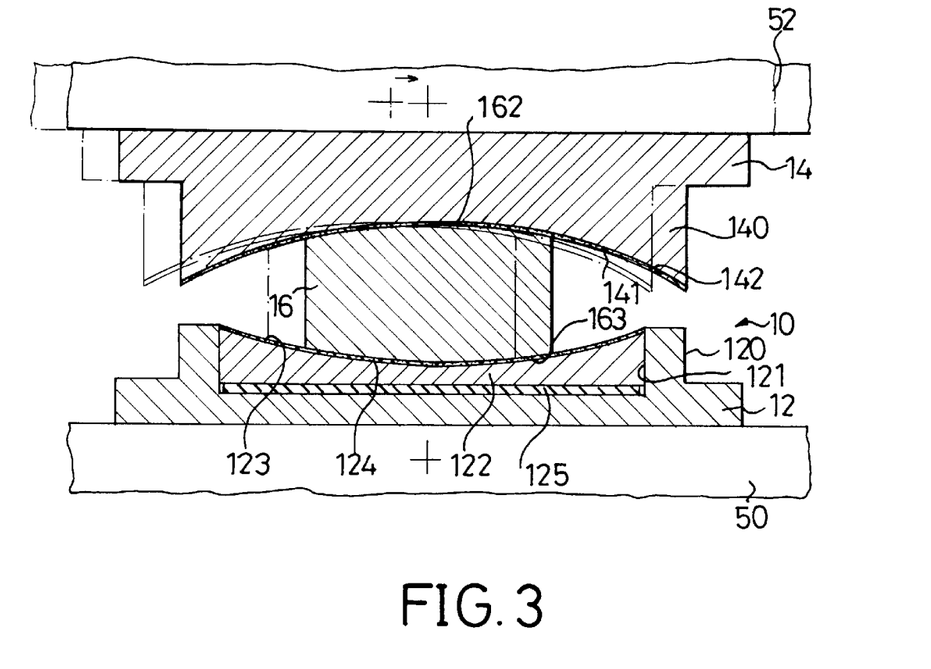
FIG. 3 is an operational view of FIG. 2.

Referring now to FIGS. 1–6, and initially to FIGS. 1–3, a passive vibration isolating system according to a first embodiment of the present invention comprises a positive and negative curve bearing 10 which includes a base member 12 fixedly mounted on a ground base 50, a sliding piece 16 having a lower portion mounted on the base member 12 and a first contact surface defined between the lower portion of the sliding piece 16 and a top portion of the base member 12, and a supporting member 14 fixedly mounted on an underside of a building 52 and supported on an upper portion of the sliding piece 16, and a second contact surface defined between a bottom portion of the supporting member 14 and the upper portion of the sliding piece 16.

By such an arrangement, at least one of the first and second contact surfaces is a curved surface with a concave-convex engagement.

Preferably, each of the base member 12, the supporting member 14 and the sliding piece 16 is made of a rigid metal.

In practice, the base member 12 includes a lug 120 protruding upwardly from the top portion thereof and defining a recess 121 therein.

A bearing piece 122 is securely received in the recess 121 and has a top portion forming a first concave curved surface 123. A natural rubber 125 is snugly received in the recess 121 and supported on a bottom portion of the bearing piece 122.

The supporting member 14 includes a lip 140 protruding downwardly from the bottom portion thereof and forming a second concave curved surface 141.

It is to be noted that the first concave curved surface 123 opens upwardly and has a positive curve, and the second concave curved surface 141 opens downwardly and has a negative curve such that the bearing 10 is called a positive and negative curve bearing.

The sliding piece 16 includes a first convex curved surface 163 formed on the lower portion thereof having a first wear-resistant resin layer 124 coated thereon slidably abutting the first concave curved surface 123, and a second convex curved surface 162 formed on the upper portion of the sliding piece 16 having a second wear-resistant resin layer 142 coated thereon slidably abutting the second concave curved surface 141.

In operation, referring to FIGS. 2 and 3 with reference to FIG. 1, there are a plurality of positive and negative curve bearings 10 each mounted between the building 52 and the ground base 50.

When the ground base 50 is displaced sideways due to an earthquake, the base member 12 together with the bearing piece 122 of each of the positive and negative curve bearings 10 can be moved with the ground base 50 while the sliding piece 16 can be slidably displaced between the bearing piece 122 and the supporting member 14 such that the supporting member 14 together with the building 52 is only slightly displaced, thereby decreasing a sliding deviation of the building 52 due to the sliding motion of the ground base 50, and thereby efficiently isolating the building 52 from a horizontal vibration (or shock) created by the earthquake.

The first and second wear-resistant resin layers 124 and 142 can be used to damp the sliding motion between the sliding piece 16, the supporting member 14 and the bearing piece 122.

When the earthquake is stops, the building 52 together with the supporting member 14 can be returned to its original position, as shown in phantom lines in FIG. 3, due to the sliding engagement between the sliding piece 16, the supporting member 14 and the bearing piece 122.

By such an arrangement, the building 52 relies on its weight to return to its original status without using an additional spring returning device or damping mechanism.

In addition, the bearing piece 122 can sway on the natural rubber 125 due to the elastomeric feature of the natural rubber 125 such that the building 52 can be rotated a slight angle along a horizontal axis thereof, thereby being capable of absorbing a vertical vibration created by the earthquake.

Figure 4:
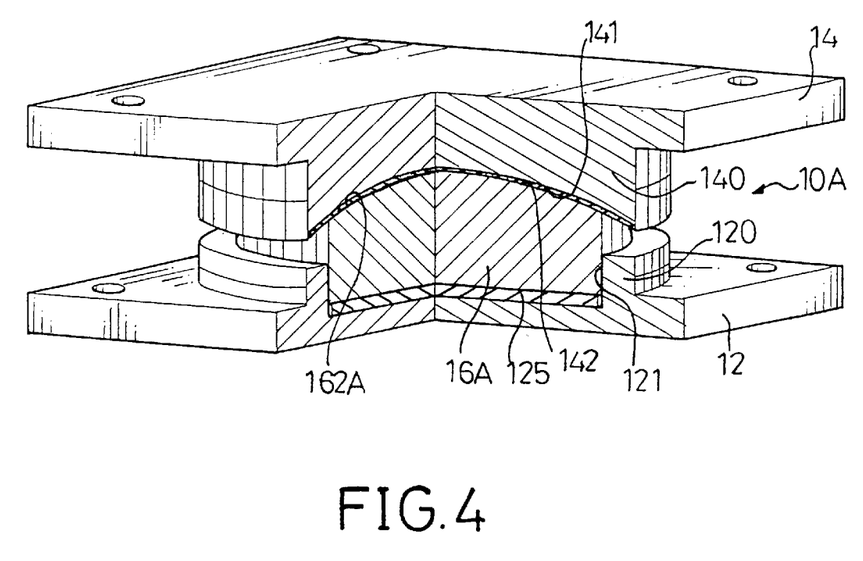
FIG. 4 is a partially cross-sectional perspective view of a passive vibration isolating system according to a second embodiment of the present invention.

Referring now to FIG. 4, a passive vibration isolating system in accordance with a second embodiment of the present invention comprises a negative curve bearing 10A which includes a base member 12 having a top portion with a lug 120 protruding upwardly and defining a recess 121 therein.

A supporting member 14 has a bottom portion with a lip 140 protruding downwardly and forming a concave curved surface 141.

A sliding piece 16A includes a lower portion securely received in the recess 121, and an upper portion forming a convex curved surface 162A having a wear-resistant resin layer 142 coated thereon slidably abutting the concave curved surface 141.

A natural rubber 125 is snugly received in the recess 121 and is supported on the lower portion of the sliding piece 16A.

The operation of the negative curve bearing 10A is similar to that of the positive and negative curve bearing 10 and will not be further described.

It is to be noted that the concave curved surface 141 opens downwardly and has a negative curve such that the bearing 10A is called a negative curve bearing.

Figure 5:
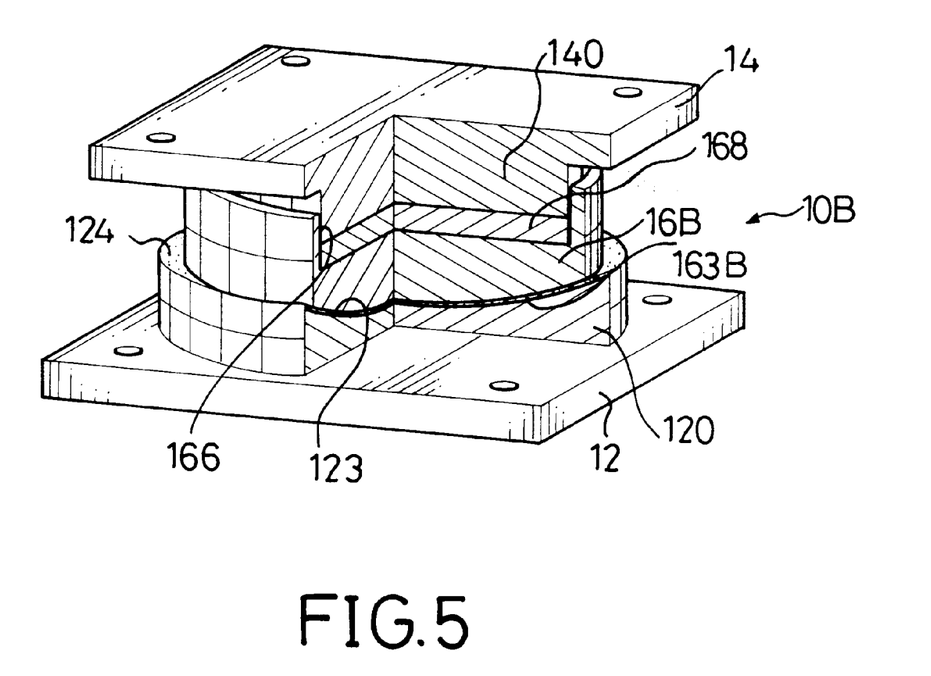
FIG. 5 is a partially cross-sectional perspective view of a passive vibration isolating system according to a third embodiment of the present invention.

Referring now to FIG. 5, a passive vibration isolating system in accordance with a third embodiment of the present invention comprises a positive curve bearing 10B which includes a base member 12 having a top portion with a lug 120 protruding upwardly and forming a concave curved surface 123.

A sliding piece 16B has a lower portion forming a convex curved surface 163B having wear-resistant resin layer 124 coated thereon slidably abutting the concave curved surface 123 and an upper portion defining a recess 166 therein.

A supporting member 14 has a bottom portion with a lip 140 protruding downwardly and securely received in the recess 166. A natural rubber 168 is snugly received in the recess 166 and is supported on a bottom portion of the lip 140.

The operation of the positive curve bearing 10B is similar to that of the positive and negative curve bearing 10 and will not be further described.

It is to be noted that the concave curved surface 123 opens upwardly and has a positive curve such that the bearing 10B is called a positive curve bearing.

Figure 6:
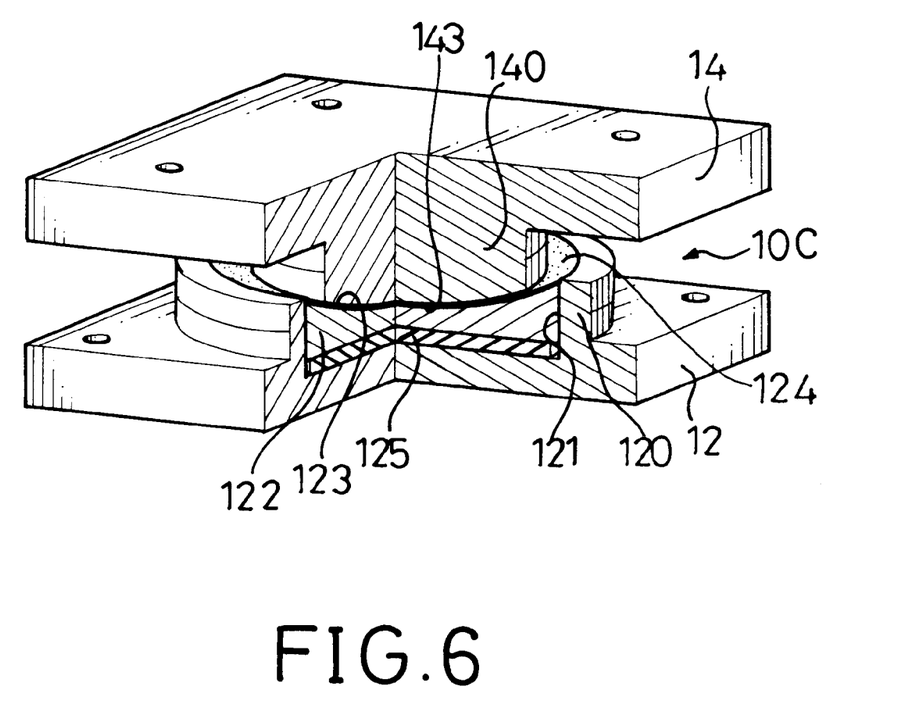
FIG. 6 is a partially cross-sectional perspective view of a passive vibration isolating system according to a fourth embodiment of the present invention.

Referring now to FIG. 6, a passive vibration isolating system in accordance with a fourth embodiment of the present invention comprises a positive curve bearing 10C which includes a base member 12 having a top portion with a lug 120 protruding upwardly and defining a recess 121 therein.

A bearing piece 122 is securely received in the recess 121 and has a top portion forming a concave curved surface 123. A natural rubber 125 is securely received in the recess 121 and is supported on a bottom portion of the bearing piece 122.

A supporting member 14 has a bottom portion with a lip 140 protruding downwardly and forming a convex curved surface 143 having a wear-resistant resin layer 124 coated thereon slidably abutting the concave curved surface 123.

The operation of the positive curve bearing 10C is similar to that of the positive and negative curve bearing 10 and will not be further described.

It should be clear to those skilled in the art that further embodiments of the present invention may be made without departing from the spirit and scope of the present invention.

What is claimed is:

1. A passive vibration isolation system comprising:

a base member including a lug protruding upwardly from a top portion thereof and defining a recess therein;

a bearing piece securely received in said recess and having a top portion forming a first concave curved surface;

a sliding piece mounted on said base member and including a first convex curved surface formed on a lower portion thereof and slidably abutting said first concave curved surface, and a second convex curved surface formed on an upper portion thereof; and a supporting member mounted on the upper portion of said sliding piece and including a lip protruding downwardly from a bottom portion thereof and forming a second concave curved surface slidably abutting said second convex curved surface.

2. The passive vibration isolating system according to claim 1, further comprising a natural rubber snugly received in said recess and supported on a bottom portion of said bearing piece.

3. The passive vibration isolating system according to claim 3, further comprising a wear-resistant resin layer coated on said first concave curved surface and abutting said first convex curved surface.

4. The passive vibration isolating system according to claim 1, further comprising a wear-resistant resin layer coated on said second concave curved surface and abutting said second convex curved surface.

* * * * *